US012627803B2

(12) United States Patent
Varekamp

(10) Patent No.: US 12,627,803 B2
(45) Date of Patent: May 12, 2026

(54) METHOD AND APPARATUS FOR ENCODING AND DECODING ONE OR MORE VIEWS OF A SCENE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 84 days.

(21) Appl. No.: 18/029,397

(22) PCT Filed: Sep. 27, 2021

(86) PCT No.: PCT/EP2021/076447
§ 371 (c)(1),
(2) Date: Mar. 30, 2023

(87) PCT Pub. No.: WO2022/069388
PCT Pub. Date: Apr. 7, 2022

(65) Prior Publication Data
US 2023/0370600 A1 Nov. 16, 2023

(30) Foreign Application Priority Data

Oct. 2, 2020 (EP) ..................................... 20199751

(51) Int. Cl.
*H04N 19/126* (2014.01)
*H04N 19/119* (2014.01)
(Continued)

(52) U.S. Cl.
CPC ......... *H04N 19/126* (2014.11); *H04N 19/119* (2014.11); *H04N 19/167* (2014.11); *H04N 19/172* (2014.11); *H04N 19/184* (2014.11)

(58) Field of Classification Search
CPC .. H04N 19/119; H04N 19/126; H04N 19/132; H04N 19/167; H04N 19/172;
(Continued)

(56) References Cited

U.S. PATENT DOCUMENTS

| | | |
|---|---|---|
| 8,767,046 B2 | 7/2014 | Redert et al. |
| 10,674,185 B2 | 6/2020 | Thomas et al. |

(Continued)

FOREIGN PATENT DOCUMENTS

| | | | | |
|---|---|---|---|---|
| EP | 3672251 A1 * | 6/2020 | ........... | H04N 19/132 |
| WO | 2020008758 A1 | 1/2020 | | |

OTHER PUBLICATIONS

International Search Report and Written Opinion from PCT/EP2021/076447 mailed Dec. 24, 2021.

*Primary Examiner* — William C Vaughn, Jr.
*Assistant Examiner* — Astewaye Gettu Zewede

(57) ABSTRACT

Methods are provided for encoding and decoding image or video data comprising two or more views (10) of a scene. The encoding method comprises obtaining (11), for each of the two or more views, a respective block segmentation mask (12) of the view and block image data (13) of the view. The method further comprises generating (14) at least one packed frame (40) containing the two or more block segmentation masks and the block image data of the two or more views; and encoding (15) the at least one packed frame into at least one bitstream (16). Each view is divided into blocks of pixels (30), and the block segmentation mask indicates which blocks of pixels belong to an area of interest (31) in the view. The block image data comprises the blocks of pixels that belong to the area of interest. Also provided are a corresponding encoder, decoder, and bitstream.

26 Claims, 11 Drawing Sheets

Enlarged part of packed frame

(51) Int. Cl.
    *H04N 19/167*     (2014.01)
    *H04N 19/172*     (2014.01)
    *H04N 19/184*     (2014.01)

(58) Field of Classification Search
    CPC .... H04N 19/176; H04N 19/184; H04N 19/46;
                     H04N 19/597; H04N 21/2187
    USPC ........................................................ 375/240
    See application file for complete search history.

(56) References Cited

U.S. PATENT DOCUMENTS

| | | | |
|---|---|---|---|
| 11,089,214 B2 | 8/2021 | Stokking et al. | |
| 11,582,383 B2 | 2/2023 | Ter Haar et al. | |
| 2005/0117019 A1 | 6/2005 | Lamboray et al. | |
| 2011/0211043 A1* | 9/2011 | Benien ................. | H04N 19/114 |
| | | | 348/43 |
| 2012/0212579 A1 | 8/2012 | Frojdh et al. | |
| 2012/0300843 A1* | 11/2012 | Horlander ............ | H04N 19/176 |
| | | | 375/E7.243 |
| 2014/0192151 A1 | 7/2014 | Wang et al. | |
| 2017/0358092 A1 | 12/2017 | Bleibel et al. | |
| 2020/0020132 A1 | 1/2020 | Sinharoy et al. | |
| 2020/0153885 A1 | 5/2020 | Lee et al. | |
| 2020/0221139 A1 | 7/2020 | Vosouchi et al. | |
| 2020/0296394 A1 | 9/2020 | Choi et al. | |
| 2020/0389672 A1* | 12/2020 | Kennett ................. | H04N 19/59 |

\* cited by examiner

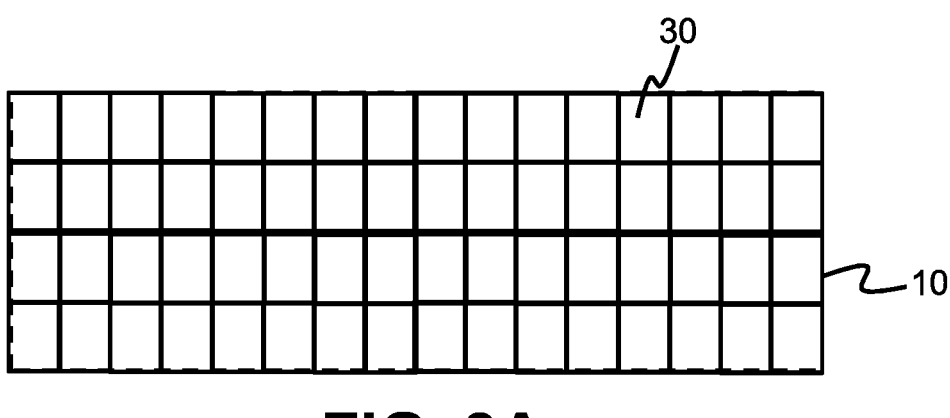
FIG. 3A
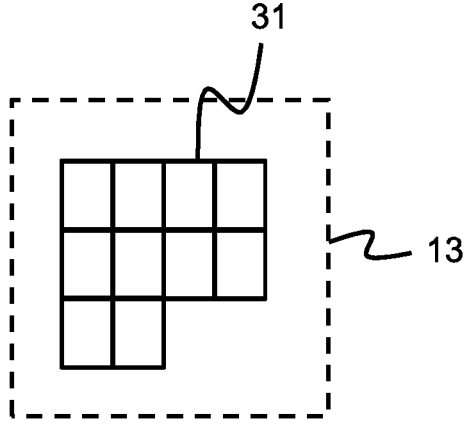
FIG. 3B
FIG. 3C

51

50

53

52

Enlarged part of packed frame

METHOD AND APPARATUS FOR ENCODING AND DECODING ONE OR MORE VIEWS OF A SCENE

CROSS-REFERENCE TO PRIOR APPLICATIONS

This application is the U.S. National Phase application under 35 U.S.C. § 371 of International Application No. PCT/EP2021/076447, filed on Sep. 27, 2021, which claims the benefit of EP Patent Application No. EP 20199751.7, filed on Oct. 2, 2020. These applications are hereby incorporated by reference herein.

FIELD OF THE INVENTION

The present invention relates to the coding of image or video-data for one or more views of a scene. It relates particularly to methods and apparatuses for encoding and decoding video sequences for virtual reality (VR) or immersive video applications captured from multiple viewpoints.

BACKGROUND OF THE INVENTION

Virtual reality can be a very immersive way to view images or video of a scene. When using virtual reality to view captured images or video of a scene, multiple cameras are usually required to capture many views of the scene from varying angles to allow the viewer to move around within the virtual reality scene. The more views that are captured from different angles, the more freedom the viewer can have to move within the virtual reality scene, and the more accurate rendered views of the scene can be. However, increasing the number of views that are captured increases the amount of data that must be processed and transmitted. For a limited bandwidth, this can reduce the image or video quality of the virtual reality scene experienced by the viewer, as the data must be more highly compressed.

Multiple views of a scene are often encoded together with meta-data that indicates to the decoder how to recover the original views. Efficient encoding often requires computationally expensive determination steps and causes latency, as the transmission of data to the viewer is delayed. There may be a trade-off between efficiency (in terms of bitrate or pixel rate for a given bandwidth) and latency. For live-streamed video, latency is a particular concern, as the viewer wants to experience the virtual reality scene without delay, particularly in two-way streaming scenarios such as video conferencing.

SUMMARY OF THE INVENTION

It would be desirable to encode and decode one or more views of a scene efficiently—in terms of computational effort and data rate (bandwidth).

The invention is defined by the claims. According to an aspect of the invention, there is provided a method of encoding image or video data, according to claim 1.

For each view, the block segmentation mask indicates the locations of the blocks of pixels that belong to the area of interest. There may be more than one area of interest in any given view.

Embodiments of the method can facilitate simple and low-latency encoding of multi-view video. The block segmentation masks can, in effect, provide implicit metadata that allows a decoder to reconstruct one or more of the views quickly and easily from the at least one packed frame.

Meanwhile, pixel rate can be reduced, because only a part of each view (namely, the area of interest) is encoded/transmitted.

In some embodiments, the at least one packed frame may be a single packed frame. The at least one bitstream may be a single bitstream.

For each block of pixels in a view there may be a corresponding pixel in the block segmentation mask that indicates whether or not the block of pixels belongs to the area of interest. Thus, there may be as many pixels in the block segmentation mask as there are blocks of pixels in the respective view. In some embodiments, there may be more than one pixel in the block segmentation mask that corresponds with a block of pixels in a view. For example, a block of pixels in a view may have a corresponding block of pixels in the block segmentation mask that indicates whether or not the block of pixels in the view belongs to the area of interest. The block of pixels in the block segmentation mask may be smaller than the block of pixels in a view.

In each block segmentation mask, each pixel may comprise a pixel value indicating whether or not the corresponding block of pixels is part of the area of interest. The pixel value may be a luminance value, or another pixel value, such as a chrominance, depth, or transparency value.

A pixel value used to indicate blocks belonging to an area of interest may be separated from a pixel value used to indicate blocks not in the area of interest by unused levels. The unused levels can create robustness to small deviations in the pixel value that may be introduced by applying traditional lossy video compression techniques to the packed frame. Provided that the resulting ranges of pixel values remain distinct and separable, in spite of such deviations, it may be possible to reconstruct the block segmentation map without error at the decoder.

In some embodiments, there may be more than one area of interest. The pixel values of the block segmentation mask may act as indices for the areas of interest. For example, a first area of interest may be labelled, in the block segmentation mask, with a first nonzero pixel value; and a second area of interest may be labelled, in the block segmentation mask, with a second nonzero pixel value. Blocks that do not belong to any area of interest may be labelled with a pixel value of zero.

The area(s) of interest may comprise or consist of a foreground object (or objects). The remainder of the view may comprise or consist of background.

The block image data may consist exclusively of the image data for the blocks of pixels belonging to the area of interest.

The image or video data comprises multiple views.

For each view, the blocks of pixels belonging to the area of interest may be packed in a packed frame in a sequence that is based on a scan order of the respective block segmentation masks.

Accordingly, a packed frame may comprise a first block segmentation mask associated with a first view followed consecutively by a second block segmentation mask associated with a second view. The block image data may comprise one or more blocks of pixels of the first view, followed consecutively by one or more blocks of pixels of the second view. Third, fourth and further views may be added in the same manner.

The scan order of the block segmentation masks may be raster scan order (that is, scanning across rows before scanning along columns).

Obtaining the block segmentation mask may comprise segmenting each view to generate the block segmentation mask. For example, if the views are captured against a chroma key background such as a green screen, the segmentation may comprise classifying pixels as foreground or background by colour separation (colour keying). Any block of pixels including a predetermined minimum number of foreground pixels may be marked as foreground in the block segmentation map.

The at least one packed frame may comprise one packed frame having a first contiguous part comprising the block segmentation masks of the two or more views; and a second contiguous part comprising the block image data of the two or more views.

The two or more block segmentation masks can be packed contiguously in the packed frame, whereby each block segmentation mask is adjacent to at least one other block segmentation mask. The first part may be a top-left-most part of the packed frame.

The at least one bitstream may consist of one bitstream. The first part may be encoded so that it appears in the one bitstream ahead of the second part. This can facilitate rapid and efficient decoding, wherein the decoder can receive and optionally decode the block segmentation masks before receiving and optionally decoding the block image data. Thus, when the block image data is received/decoded, the decoder will already have the necessary information to position the blocks of pixels in the reconstructed view.

In other embodiments, the at least one packed frame may comprise two or more packed frames. A first packed frame may comprise the two or more block segmentation masks. A second packed frame may comprise the block image data. This can allow the block segmentation masks to be encoded separately from the block image data—for example, using different video compression parameters. A first bitstream may be encoded comprising the first packed frame and a second bitstream may be encoded comprising the second packed frame.

The blocks of pixels in the block image data of a view may be all the same size, within that view, or optionally the blocks may be all the same size in the block image data of all views. In the former case, the block size is constant within a view (or within each view, individually). This can facilitate efficient packing and simple encoding and decoding. In the latter case, the block size is constant across all views. This can also facilitate efficient packing and simple encoding and decoding.

The block image data of respective different views may be packed in the at least one packed frame in a block-interleaved arrangement, wherein a first block of pixels of a first view is followed consecutively by a first block of pixels of a second view. This may be followed consecutively by a first block of pixels of a third view, and so on until a first block of pixels from each view has been packed into a packed frame. This pattern of taking a single block of pixels at a time from each view and interleaving the blocks adjacent to one another in a packed frame may be repeated for subsequent blocks of each view as long as there is a sufficient number of blocks in each view to maintain the pattern.

This approach may lead to good video compression efficiency, in particular when the content and location of the area of interest is similar across different views. In this case, the content of adjacent blocks of pixels interleaved in a packed frame is likely to be similar. Standard video compression algorithms may exploit this spatial consistency to reduce the bitrate required to encode the blocks and/or to increase the compression quality, for a given bitrate.

The block image data of respective different views may be packed in the at least one packed frame in a row-interleaved arrangement, wherein the blocks of pixels of a first row of a first view are followed consecutively by the blocks of pixels of a first row of a second view. This may be followed consecutively by the blocks of pixels of a first row of a third view, and so on until a first row of blocks from each view has been packed. This pattern of taking an entire row of blocks at a time from each view and interleaving the rows adjacent to one another in a packed frame may continue as long as there is a sufficient number of rows in each view to maintain the pattern. Again, this approach may lead to good video compression efficiency, for scenes containing typical visual content.

Encoding the at least one packed frame into the at least one bitstream optionally comprises using a video compression algorithm, optionally a standard video compression algorithm, such as H.264 or HEVC. This can facilitate at least partial backward compatibility with existing encoding and decoding hardware and software. It can also avoid the need for proliferation of different video compression standards specifically to support multi-view video.

The method may comprise: choosing a quality factor of the video compression algorithm such that at least the block segmentation masks are reconstructable without error from the at least one bitstream; and/or choosing a number of quantization levels used in the video compression algorithm such that at least the block segmentation masks are reconstructable without error from the at least one bitstream. Optionally, the method may comprise jointly choosing the number of quantization levels and the quality factor used in the video compression algorithm, to ensure that the block segmentation masks are reconstructable without error from the at least one bitstream.

The at least one packed frame may comprise two packed frames. A first packed frame may comprise the two or more block segmentation masks. A second packed frame may comprise the block image data. The first packed frame may be encoded using lossless video compression. The second packed frame may be encoded using lossy video compression.

The method may comprise quantizing the block segmentation masks to a first number of quantization levels, and quantizing the block image data to a second number of quantization levels, wherein the first number is different from the second number. By setting the quantization parameters independently, the method can ensure that the block segmentation masks are reconstructable without error following video compression, while avoiding wasting unnecessary bandwidth on the block image data. For example, the block image data may be quantized in a manner that results in some errors in the reconstructed block image data at the decoder. In this way, the block segmentation masks can effectively be compressed in a lossless manner, while the block image data is compressed in a lossy manner.

The at least one packed frame may comprise a third part, wherein the third part comprises depth data of the two or more views; and/or the at least one packed frame may comprise a fourth part, wherein the fourth part comprises transparency data of the two or more views. The depth data may be included in the at least one packed frame at a lower spatial resolution than the block image data. For example, the depth data may be provided in smaller blocks and/or a reduced number of blocks.

Also provided is a decoding method according to claim 10.

The block image data consists solely of the blocks of pixels that belong to the area of interest. All of the two or more views may be reconstructed. The method may further comprise compositing the area of interest onto a background scene to synthesise a complete view.

Any of the methods as summarised above or as claimed may be used in livestreaming multi-view video. The coding scheme may be well-suited to the needs of live video streaming, since its simplicity facilitates low latency at both the encoder and decoder ends.

Also provided is a computer program according to claim 12. The computer program may be stored on a computer readable medium, optionally a non-transitory computer readable medium.

Also provided are an encoder according to claim 13 and a decoder according to claim 14.

Also provided is a bitstream according to claim 15. The block segmentation masks can be packed into a packed frame ahead of the block image data. The block segmentation masks can be decoded before the block image data by the decoder.

BRIEF DESCRIPTION OF THE DRAWINGS

For a better understanding of the invention, and to show more clearly how it may be carried into effect, reference will now be made, by way of example only, to the accompanying drawings, in which:

FIG. 3A illustrates a view of a scene that is divided into blocks of pixels according to an embodiment;

FIG. 3B illustrates a block segmentation mask (enlarged) for the view of FIG. 3A;

FIG. 3C illustrates block image data for the view of FIG. 3A;

DETAILED DESCRIPTION OF THE EMBODIMENTS

Figure 1:
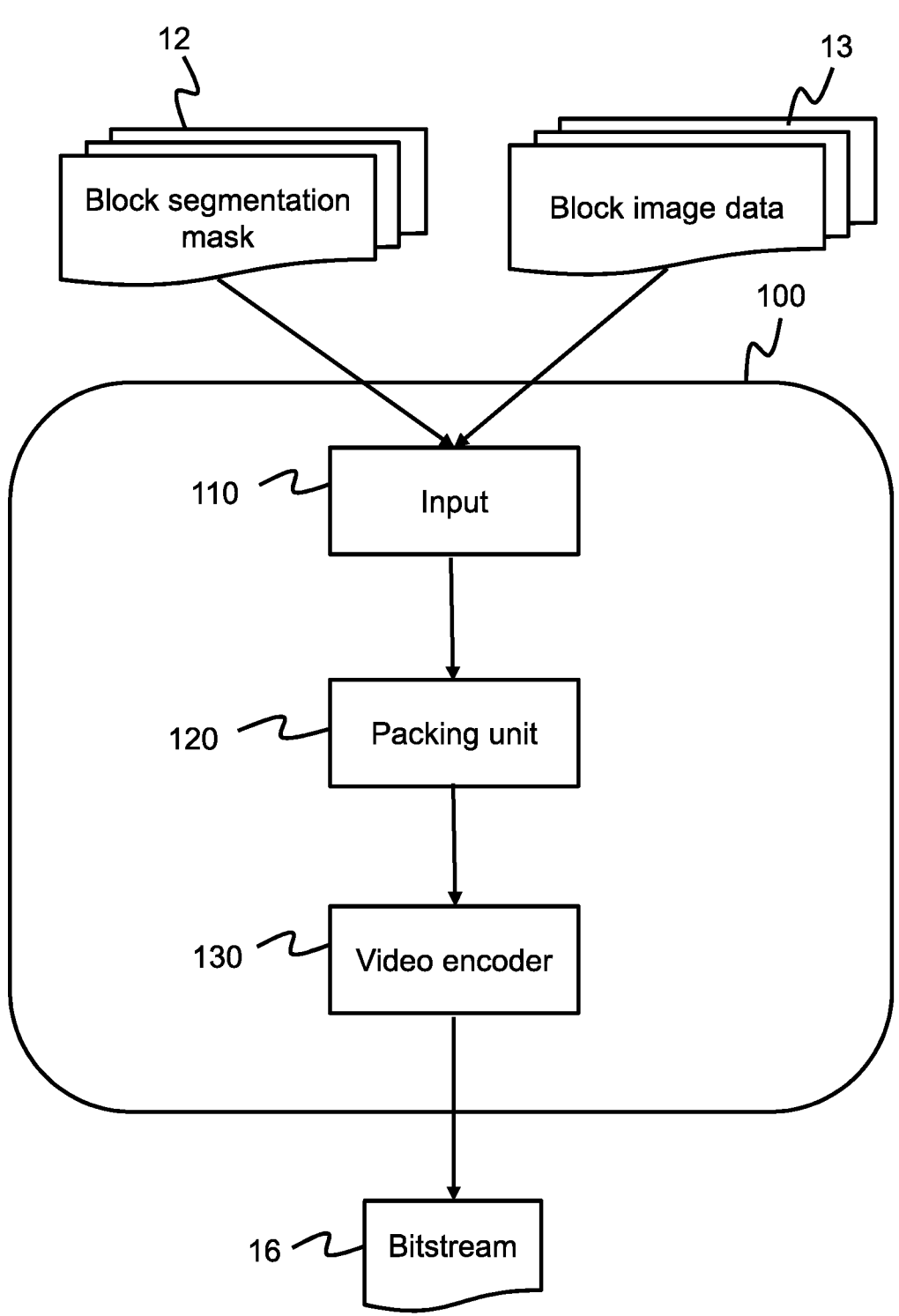
FIG. 1 is a block diagram of an encoder according to an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1 is a block diagram of an encoder 100 according to an embodiment. The encoder 100 comprises an input 110 configured to obtain two or more block segmentation masks 12 and block image data 13. The input 100 is connected to a packing unit 120 configured to generate a packed frame 40. The packing unit 120 is connected to a video encoder 130 configured to encode the packed frame 40 into at least one bitstream 16.

Figure 2:
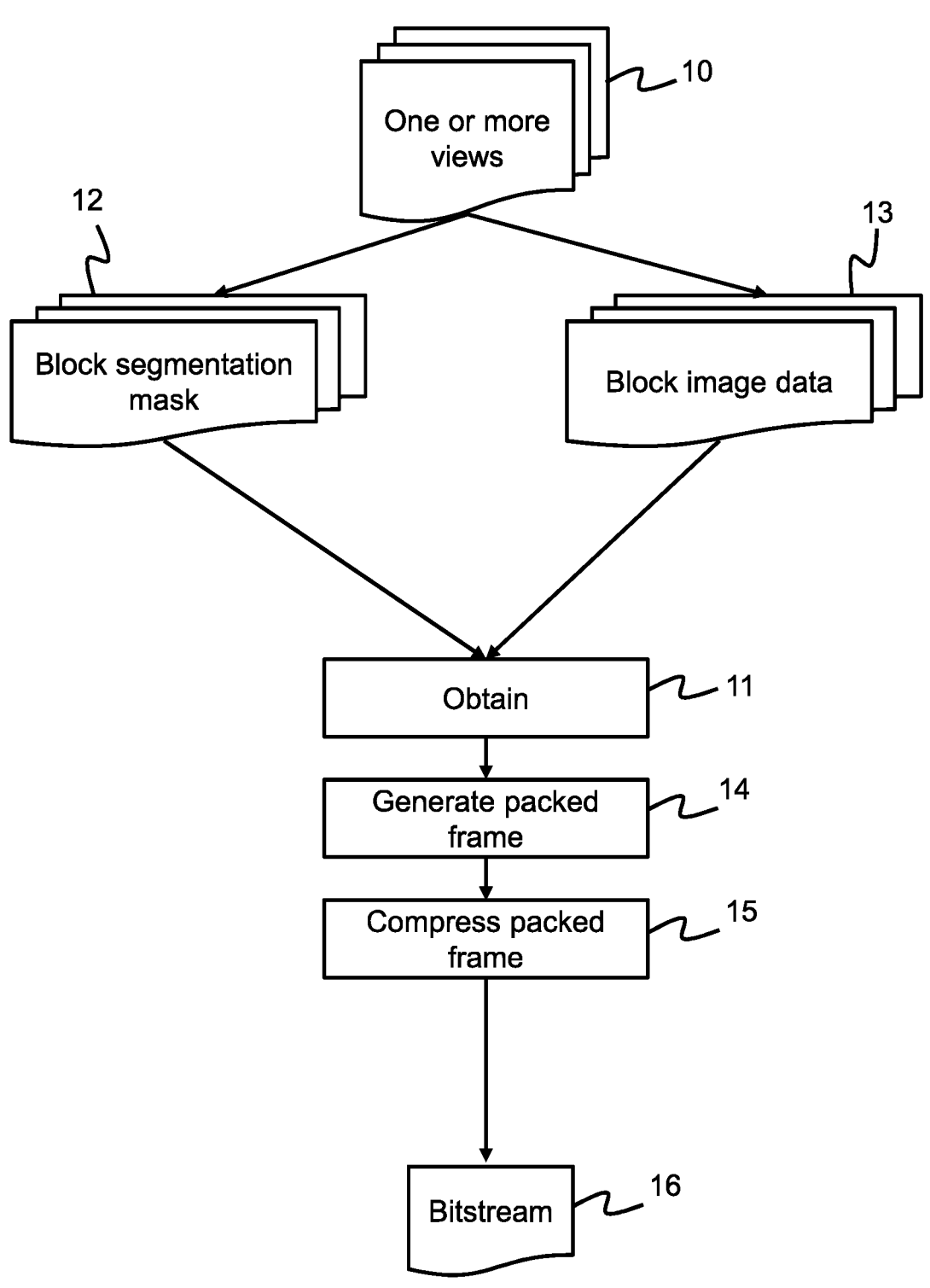
FIG. 2 is a flow chart illustrating an encoding method performed by the encoder of FIG. 1.

The method performed by the encoder 100 will now be described with reference to FIGS. 2, 3, 4 and 6. FIG. 2 is a flowchart illustrating the method. In the embodiment that will be described in detail below, three views 10 of a scene have been captured. FIG. 3A illustrates one of the views 10 of the scene. The view 10 is divided uniformly into blocks of pixels 30. Each of the other views (not shown) is also divided uniformly into blocks of pixels. The blocks of pixels 30 in the views 10 are all the same size, in this example. Each view 10 contains a foreground region, and a background region. As is common in the art, a green screen can be used as the background. An example of this is a view 10 containing an object placed in front of a green screen. Use of a green screen as a background allows each view 10 to be segmented by chroma keying. Pixels that match the colour of the background screen (in this case green) are identified as background pixels.

FIG. 3B illustrates an enlarged view of a block segmentation mask 12 for the view 10 of FIG. 3A. Chroma keying has been used to identify a foreground region, referred to herein as the area of interest 31, and a background region. The block segmentation mask 12 is a map of the view 10, indicating which blocks of pixels 30 in the view 10 belong to an area of interest 31. Each block of pixels 30 in the view 10 is represented by a pixel in the block segmentation mask 12, making the block segmentation mask 12 a low resolution segmentation mask of the view 10.

The block segmentation mask 12 indicates whether a block of pixels 30 in the view 10 belongs to an area of interest 31 by setting a pixel value of each pixel in the block segmentation mask 12 to a first or second value. In the case of segmentation by chroma-keying, a block may be determined to belong to the area of interest if it contains at least one foreground pixel (that is, at least one pixel of a colour other than green).

In FIG. 3B, the pixel values in the block segmentation mask are luminance values. The light region 32 of the block segmentation mask 12 indicates the blocks of pixels 30 of the view 10 that belong to an area of interest 31. The dark region 33 of the block segmentation mask 12 indicates the blocks of pixels 30 of the view 10 that do not belong to an area of interest 31. FIG. 3C illustrates the block image data 13 of the view 10 of FIG. 3A, as indicated by the block segmentation mask 12 of FIG. 3B. The block image data 13 comprises only the blocks of pixels 30 that belong to the area of interest 31.

Reference is now made to the flowchart of FIG. 2. In step 11, the input 110 obtains, for each of the views 10, a respective block segmentation mask 12 and block image data 13. In this example, the block segmentation masks 12 and block image data 13 are created using chroma keying. The block segmentation masks 12 and block image data 13 are passed to the packing unit 120.

Figure 4:
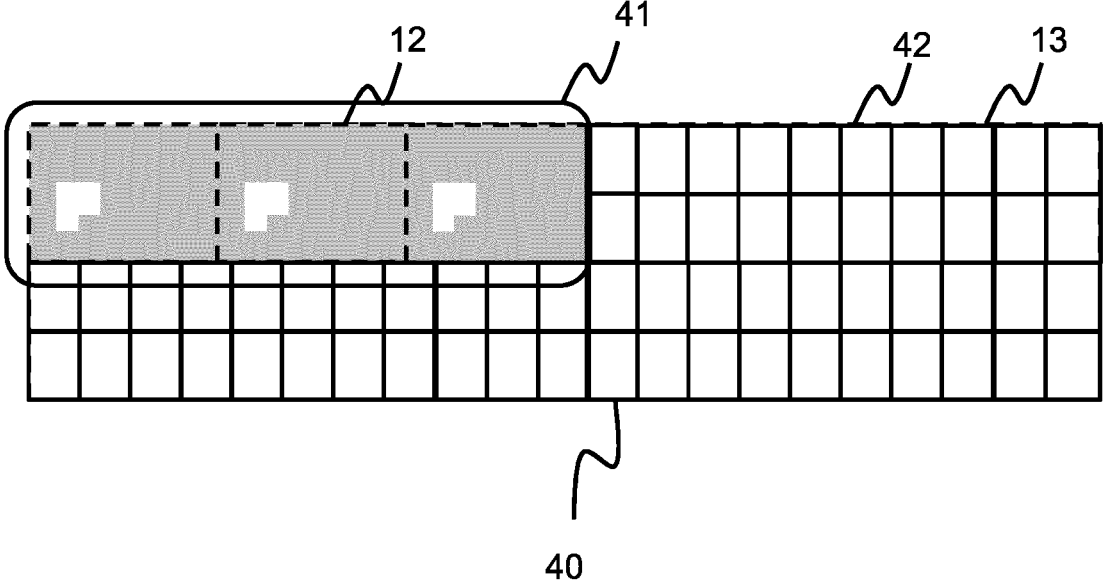
FIG. 4 illustrates a packed frame according to an embodiment.

In step 14, the packing unit 120 generates a packed frame 40 containing the block segmentation masks 12 and block image data 13. FIG. 4 illustrates the packed frame 40. The packing unit 120 packs the block segmentation masks 12 contiguously in a first part 41 of the packed frame 40. The first part 41 of the packed frame 40 is the first part that will be encoded, and later decoded.

The packing unit 120 packs the block image data 13 into a second part 42 of the packed frame 40. The block image data 13 is also packed contiguously, leaving no space between blocks of pixels 30, or between blocks of pixels 30 and the block segmentation masks 12.

Other possible configurations of the packed frame are shown in FIG. 5, and will be explained later below.

The packing method used to generate the packed frame 40 shown in FIG. 4 will now be explained with reference to FIG. 6. Block segmentation masks 60, 61 and 62 indicate respective areas of interest in first, second, and third views 600, 610, and 620.

First, the block segmentation masks 60, 61, 62 are packed in a row in the first part of the packed frame 40. The first block segmentation mask 60 is packed in the left most position in the row. The second block segmentation mask 61 is packed next to the first 60, and the third block segmentation mask 62 is packed next to the second block segmentation mask 61. The order of the block segmentation masks 60, 61, 62 in the row from left to right defines a sequence.

Next, the block image data from each of the three views 600, 610, 620 is packed into the second part of the packed frame 40 by block interleaving. The packed frame 40 is packed with blocks of pixels in raster scan order. First, the packing unit 120 packs a first block of pixels from the first view 600 into the packed frame 40. Then, the packing unit 120 packs a first block of pixels from the second view 610 into the packed frame 40. Then, the packing unit 120 packs a first block of pixels from the third view 620 into the packed frame 40. The cycle then repeats, packing a second block of pixels from the first view 600 and so on, repeating until there are not enough pixels from each view to continue the sequence. In this way, the blocks of pixels in the packed frame 40 are interleaved such that no block of pixels is immediately before or after another block of pixels from the same view, unless there are no longer enough blocks of pixels to maintain the interleaving. The sequence of blocks of pixels in the packed frame 40 is the same as the sequence defined by the order of the block segmentation masks 60, 61, 62 in the packed frame.

Figure 6:
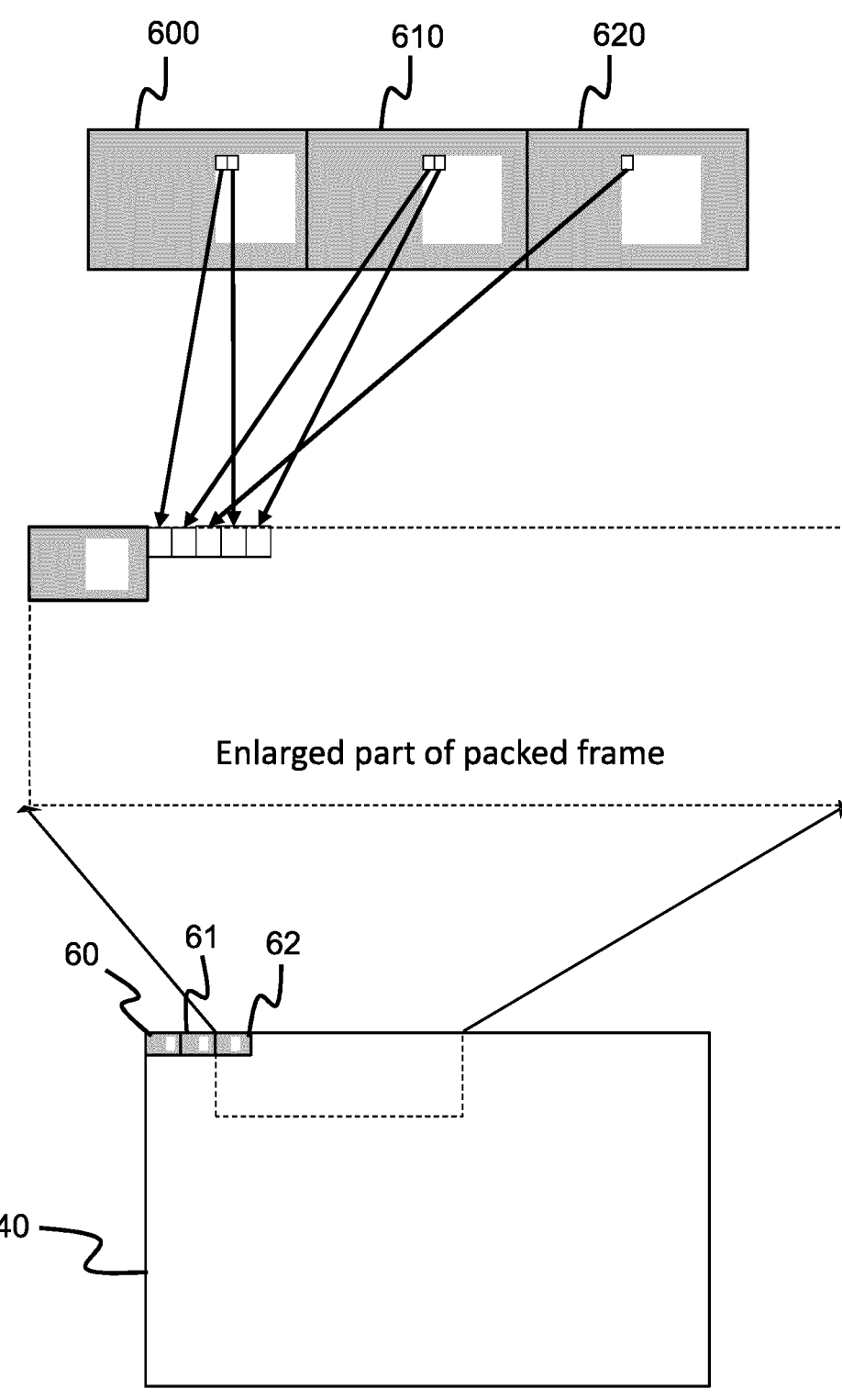
FIG. 6 illustrates a packing method according to an embodiment.

In the same way that the block image data is packed into the packed frame 40 in raster scan order, blocks of pixels from the views 600, 610, 620 are selected for packing in raster scan order as is shown by FIG. 6. Blocks of pixels are selected from each view 600, 610, 620 for packing in rows from the top to the bottom of the views 600, 610, 620. FIG. 6 shows the top left most block of pixels from view 600 is the first to be packed from the view as it is the first block in the area of interest according to raster scan order. The next block packed from view 600 is the block immediately to the right of the first, the second block according to raster scan order.

Figure 7:
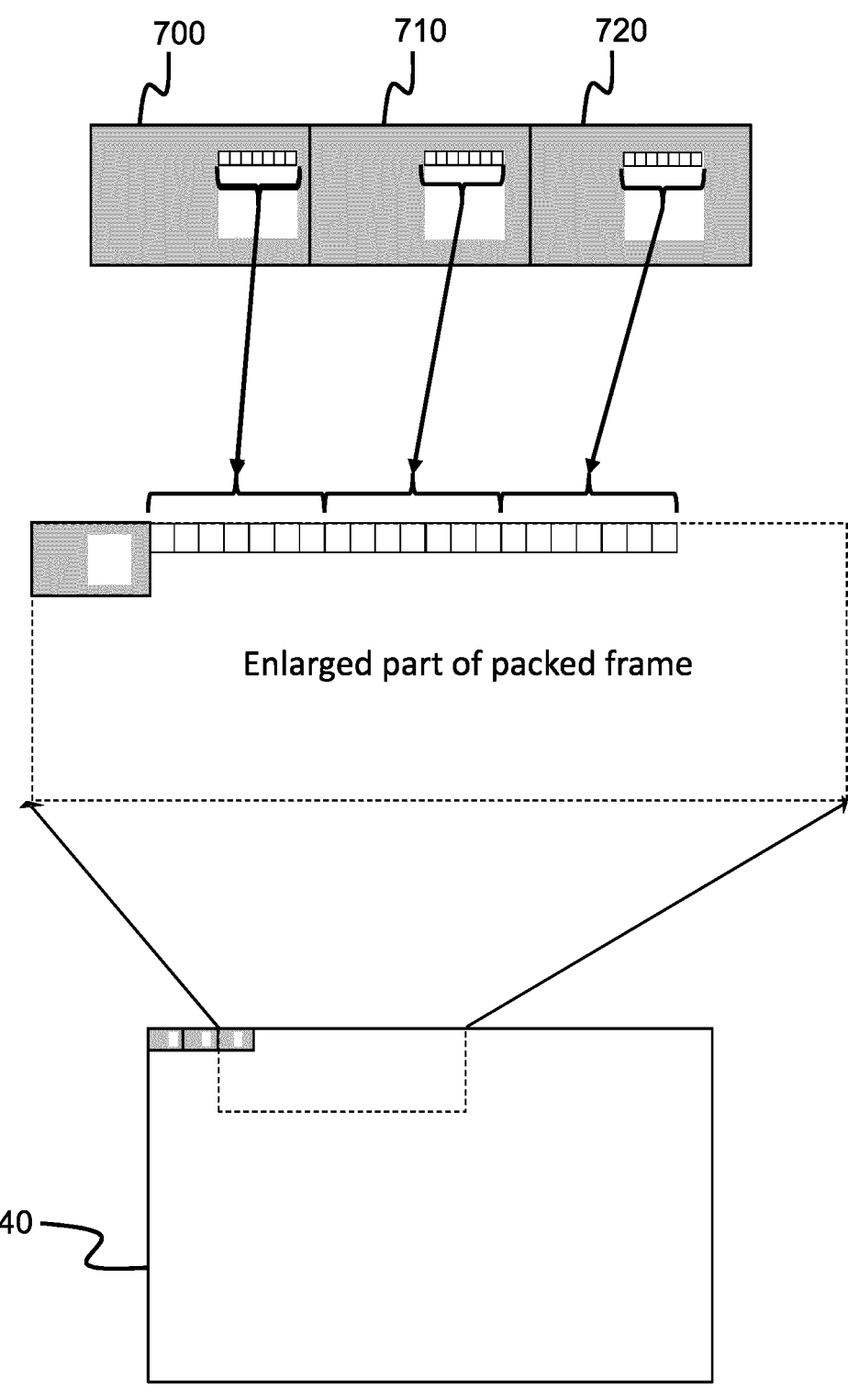
FIG. 7 illustrates a packing method according to an embodiment.

FIG. 7 illustrates an alternative method of packing blocks of pixels, called row interleaving, which will be explained later below.

After packing, in step 14, the packed frame 40 is passed to the video encoder 130. The video encoder 130 encodes the packed frame 40 into a bitstream 16. Encoding the packed frame comprising compressing 15 the packed frame. Compressing 15 the packed frame 40 reduces the amount of data that must be encoded into the bitstream 16 and transmitted. The compressing 15 is done in a lossy manner in this example. A standard video compression codec may be used. In the present example, the High Efficiency Video Coding (HEVC) compression standard is used.

Compressing 15 the packed frame 40 can reduce the amount of data to be encoded and transmitted, in particular because of the way that the packed frame 40 has been packed. Where the areas of interest 31 in the respective views 10 contain similar visual content, as is likely for multi-view images or video of a scene, the block image data 13 from each view 10 is likely to be similar in visual content. More specifically, because of the block interleaving packing method, neighbouring blocks of pixels in the packed frame are likely to be those that correspond to similar parts of the area of interest seen from the different views. These blocks of pixels are likely to have the most similarity in terms of visual content. Existing video compression algorithms such as HEVC can exploit this similarity (redundancy). In this way, by using block interleaving or row interleaving, and compressing the packed frame using a video compression algorithm, embodiments of the invention can reduce the amount of data that needs to be transmitted, while exploiting existing video compression software and/or hardware.

Figure 8:
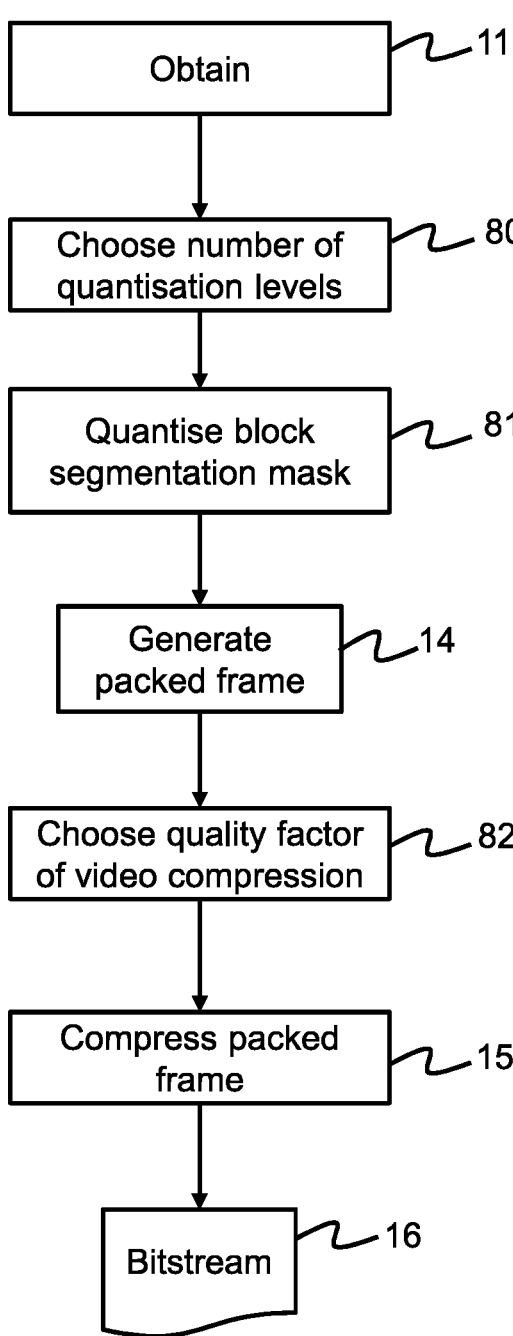
FIG. 8 illustrates an encoding method according to an embodiment.

Additional steps that can be performed by the encoder in some embodiments are shown in FIG. 8, and will be explained later below.

Figure 9:
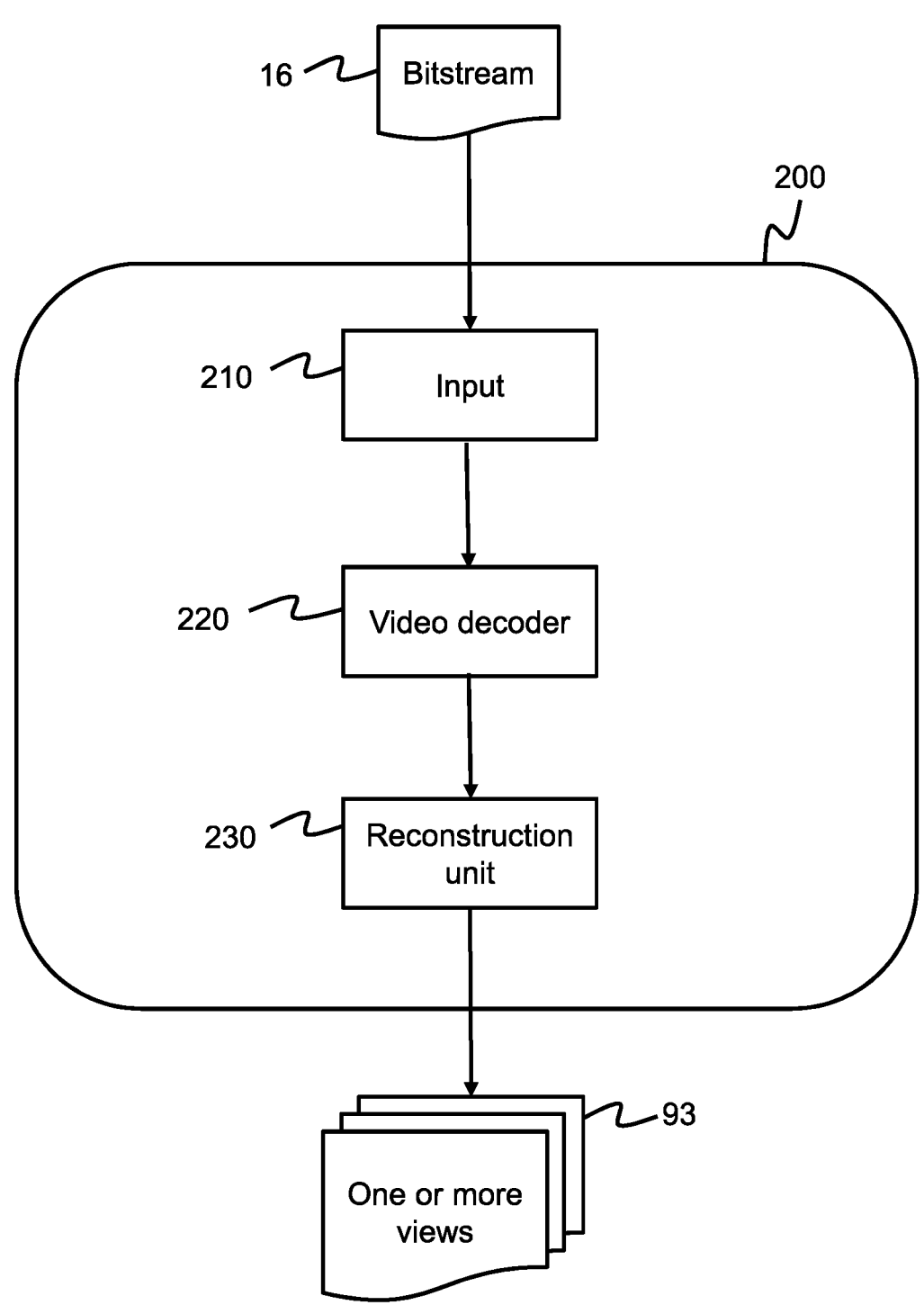
FIG. 9 is block diagram of a decoder according to an embodiment.

FIG. 9 is a block diagram of a decoder 200 according to an embodiment. The decoder 200 comprises an input 210 configured to receive a bitstream 16. The input 210 is connected to a video decoder 220, which is configured to decode the bitstream 16. The video decoder 220 is connected to a reconstruction unit 230, which is configured to reconstruct one or more views 93 of the scene. It is assumed that the bitstream 16 received by the decoder 200 is produced by the encoder 100 in the embodiment described above.

The method performed by the decoder 200 will now be described with reference to FIG. 10. In step 90, the input 210 receives the bitstream 16. The bitstream 16 comprises the packed frame 40. The bitstream 16 is passed to the video decoder 220, where it is decoded in step 91. Decoding comprises decompression (using HEVC) and retrieving the packed frame 40. After decoding, the packed frame is passed to the reconstruction unit 230.

Figure 11:
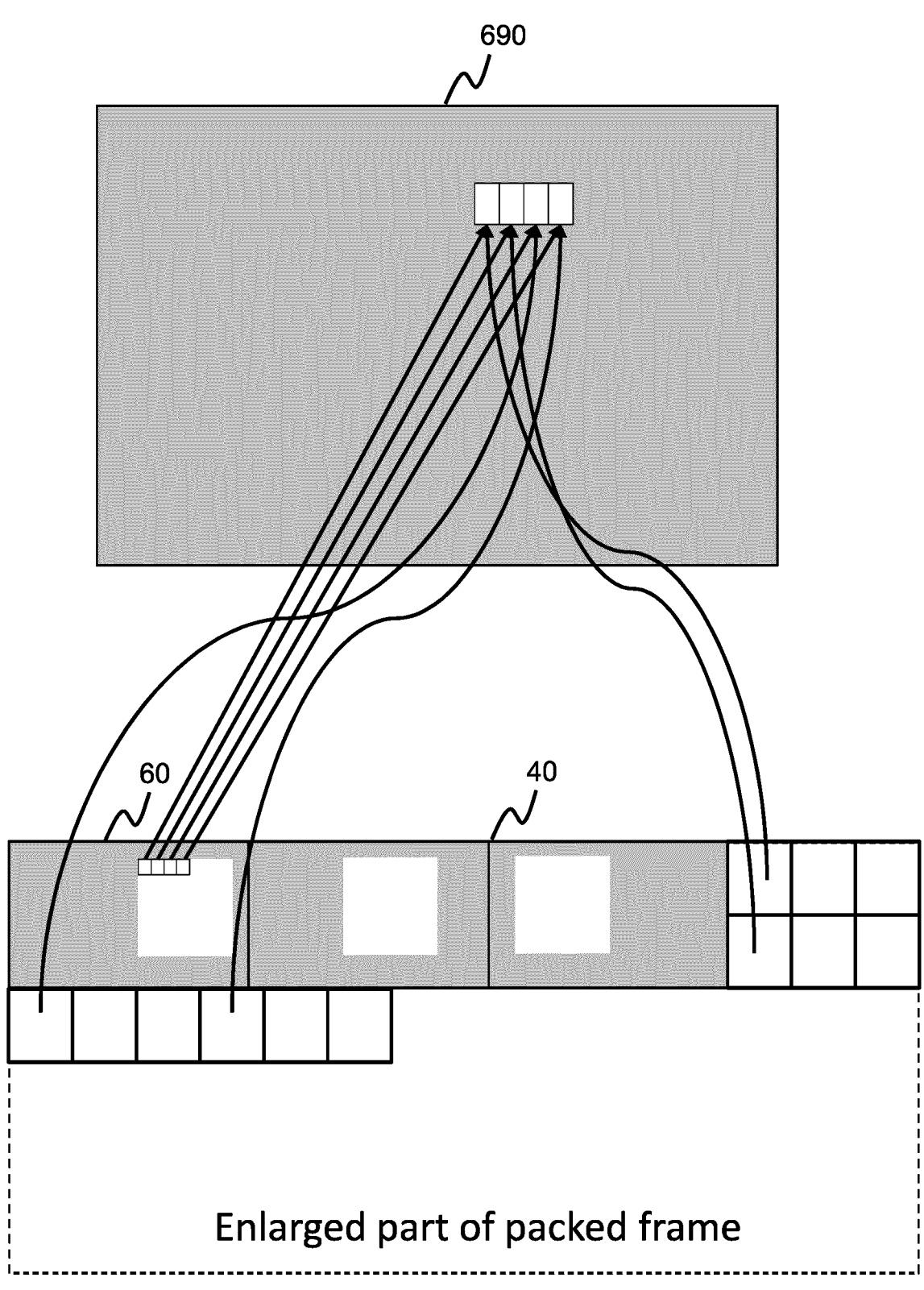
FIG. 11 illustrates a reconstruction method according to an embodiment.

In step 92 the reconstruction unit 230 reconstructs three views 93 of the scene. Reconstruction will first be explained with reference to reconstructing only a first view 690, for simplicity. The reconstruction method, shown in FIG. 11, comprises creating a blank first reconstructed view 690. The reconstruction unit 230 inserts the blocks of pixels of the first view into the first reconstructed view 690 at the foreground positions indicated by the block segmentation mask 60 of the first view.

The block segmentation mask 60 acts as a map, indicating the positions of the foreground blocks in the reconstructed view 690 (illustrated by the straight arrows). The encoder and decoder both use the same predefined scan order to scan the block segmentation masks and block image data. When the decoder finds the first foreground pixel of the block segmentation mask, it inserts the first decoded block of pixels at the position in the reconstructed view 690 indicated by the pixel of the block segmentation mask (illustrated by the curved arrows). When it finds the next foreground pixel of the block segmentation mask 60, it inserts the next decoded block of pixels for that view, and so on, until all of the foreground blocks of pixels for that view have been arranged in their correct positions in the reconstructed view 690.

This method is applied likewise to reconstruct all views 93, in the inverse of the packing process that was performed at the encoder.

The decoder 200 does not require any additional metadata to know where to find and where to position the relevant blocks of pixels. Instead, the sequence of the block segmentation masks 12 and blocks of pixels 30 in the packed frame acts as implicit meta-data, indicating to the decoder 200 which block segmentation mask 12 relates to which blocks of pixels. Avoiding the need to include additional meta-data with the packed frame 40 can help to reduce the amount of data that must be encoded. And the reconstruction using the block segmentation maps is relatively simple to implement—it does not involve complex or time-consuming operations that could cause significant additional latency.

The foreground blocks (that is, the block image data of the area of interest) can be superimposed by the decoder on any desired background—for example a computer graphics background, or an image or video from a different video stream. In some embodiments, multiple reconstructed views 93 may be used to create a new virtual view with a viewpoint different from any of the views originally captured by the cameras.

Figure 5A:
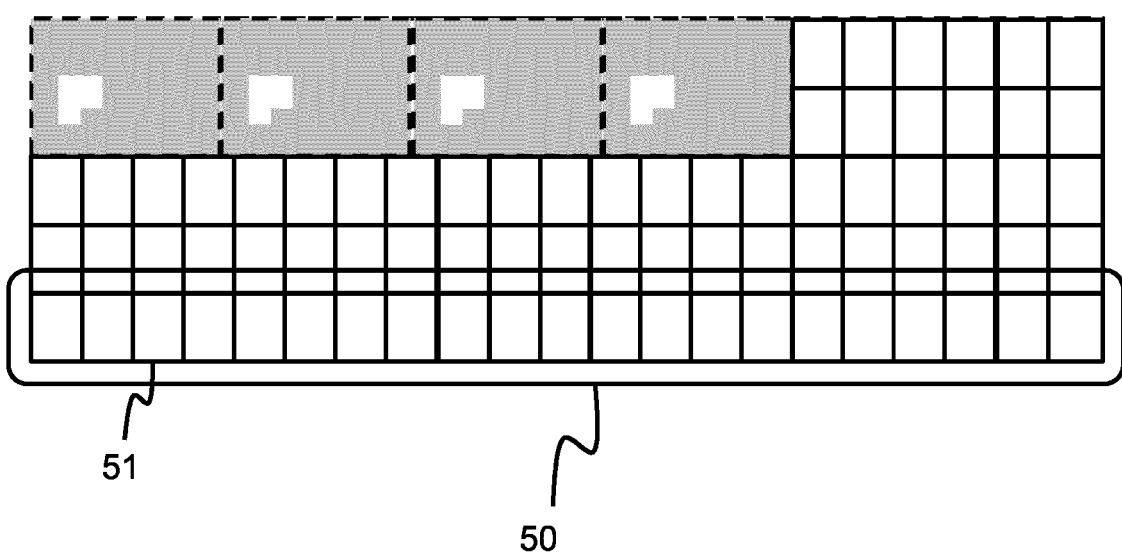
FIG. 5A illustrates a packed frame according to an embodiment.
Figure 5B:
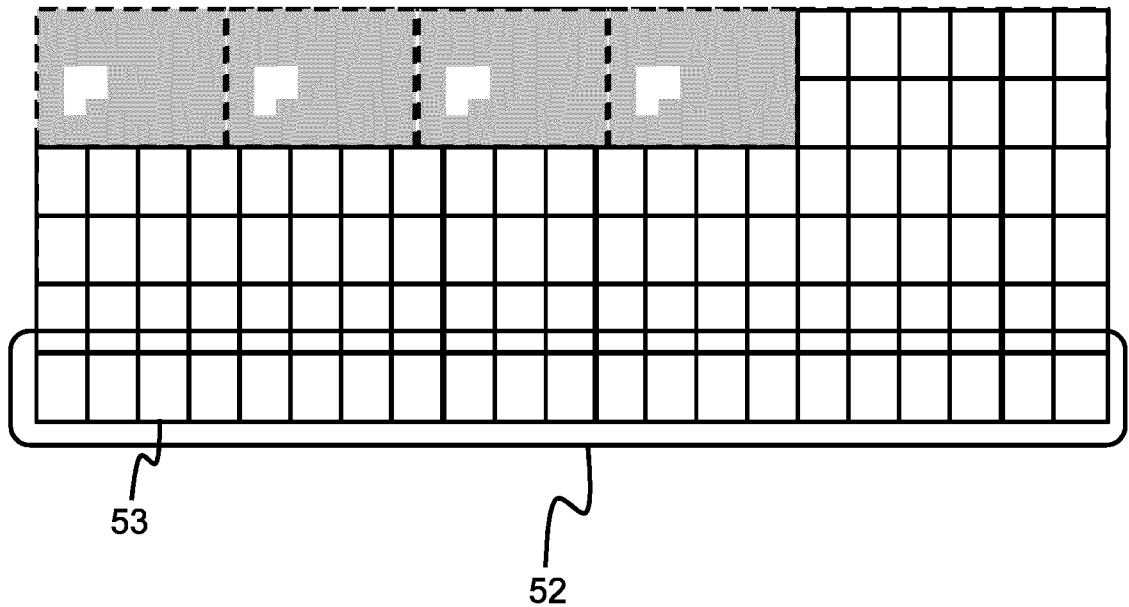
FIG. 5B illustrates a packed frame according to an embodiment.

Possible alternative configurations of the packed frame 40, as shown in FIGS. 5A and 5B, will now be discussed. FIG. 5A illustrates a packed frame 40 having a third part 50, in addition to the first and second parts (not shown). The third part is at the bottom of the packed frame, and is the last part of the frame to be encoded and decoded. The third part 50 comprises block depth data 51 for the two or more views 10. The block depth data 51 is packed contiguously in the packed frame 40. The block depth data 51 may be included in the at least one packed frame 40 at a lower spatial resolution than the block image data 13. For example, the block depth data 51 may be provided in smaller blocks and/or a reduced number of blocks, because the human visual system may be less sensitive to depth errors than errors in the image data.

FIG. 5B illustrates another packed frame 40 having a fourth part 52 in addition to the first, second and third parts (not shown). The fourth part 52 comprises block transparency data 53 of the two or more views 10. The block transparency data 53 is packed contiguously within the fourth part 52. Transparency data can be determined during the segmentation of the two or more views, and stored in an alpha channel 10. Blocks of pixels at the boundary between the area of interest 31 and the background will likely contain both some (green) background pixels and some foreground pixels (not green). The block transparency data for the blocks of pixels identifies, for each pixel in the block, to what degree the pixel is transparent. This can be determined by how green it is, in the case of chroma keying, or by any other suitable pixel-level segmentation. A transparent pixel can be treated as a background pixel during reconstruction. This can help prevent green (background) pixels, which were incorporated in the block image data of the area of interest 31, from appearing as a green halo around the object, in the reconstructed image 93. Partially transparent pixels (pixels containing some green but that are not entirely green) can have their colour values averaged by alpha-blending. If transparency data 53 is not included in the packed frame, then in some embodiments the decoder 200 can itself carry out chroma keying on the blocks of pixels to determine transparency data. That is, during reconstruction of the views 93, the decoder 200 can check each block of pixels 31(especially peripheral blocks) for green pixels in order to determine block transparency data for the reconstructed view 93.

Where the packed frame includes block depth data 51 or block transparency data 53, the block depth and block transparency data can be packed into the third and fourth parts of the packed frame in the same pattern in which the block image data is packed into the second part of the packed frame. This means that when the decoder is scanning the packed frame 40 and reconstructing the views 93, it can apply the block depth/transparency data 51, 53 to the reconstructed view with the same reverse block interleaving method that was used to generate the reconstructed view 93.

In some embodiments, the block interleaving method described with reference to FIG. 6 can be modified to interleave multiple blocks from each view—for example, taking two, three, or more blocks at a time as an interleaving unit.

FIG. 7 shows an example of a packing method based on row interleaving. Row interleaving operates similarly to block interleaving, except that instead of packing a block of pixels from each view at a time, the packing unit 120 packs rows of blocks from each view 700, 710, 720. In some embodiments, this principle is extended further by packing all blocks of pixels 30 from a first view 10 consecutively, followed by all blocks 30 from a second view 10, and so on for all views 10. The decoder 200 will always reconstruct the view 93 using the reverse of the process used to pack the packed frame 40.

Where it is desirable to decode and reconstruct only a subset of the views 10, row interleaving may be more favourable than block interleaving. With row interleaving, it is more likely that the prediction of a block of pixels 30 (at the decoder) will be based on another block of pixels 30 from the same view 10, since compression algorithms often predict based on adjacent blocks, and the whole row of blocks 30 is packed as one contiguous group. This can help to avoid the need to decode blocks of pixels 30 from additional views 10, when wishing to decode a given view 10. In the same way, it could be favourable to pack the packed frame 40 with all blocks of pixels 30 from a first view 10 placed consecutively, followed by all blocks 30 from a second view 10, and so on for all views 10.

The embodiment of the encoding method illustrated in FIG. 8 will now be explained. FIG. 8 is a flow diagram showing an encoding method including quantisation and compression. Steps 11, 14, and 15 are substantially identical to the corresponding steps in the embodiment of FIG. 2, described above.

In step 11, the encoder 100 obtains block segmentation masks 12 and block image data 13 from two or more views 10 of a scene.

In step 80, the encoder 100 chooses a number of quantisation levels for the block segmentation mask 12. It may be beneficial to quantise the block segmentation masks 12 in order to reduce the amount of data that is required to be transmitted. By way of example, a block segmentation mask 12 using luminance values as the pixel value shall be considered. A first value and a second value can be used to distinguish between foreground and background—for example, by setting all foreground pixels to 255 and all background pixels to 0. To encode the values 0 and 255 will require 8 bits. To reduce the amount of data, the pixel values can be quantised 81 into a smaller number of levels. Instead of using 0 and 255 as the first and second values, 0 and 127 could be used, for example, requiring only 7 bits to be represented. At the most extreme reduction, each pixel can have a luminance value of either 0 or 1, being represented by only a single bit.

In step 81, the chosen quantisation parameters are applied to the block segmentation masks 12. In step 14, the packing unit 120 generates a packed frame 40. In step 82, the encoder chooses a quality factor of the video compression. The higher the quality factor, the less data is lost due to lossy compression.

The packed frame is then encoded into a bitstream 16, the encoding including compressing 15 the packed frame using a HEVC codec (with the chosen quality factor). It is preferable that the decoder 200 can accurately reconstruct the block segmentation masks 12 from the compressed packed frame 40, otherwise the decoder 200 cannot reconstruct the views 93 accurately. When choosing the quantisation levels for the block segmentation masks 12, it may be useful to maintain some unused levels between the first and second pixel values. This can help make the method robust to small deviations in the pixel values that could be introduced by lossy video compression.

In order to ensure that the block segmentation masks 12 can be accurately reconstructed by the decoder 200, the block segmentation masks 12 must be compressed either by lossless compression or by lossy compression with a minimum quality factor. For example, a binary segmentation mask using the values are 0 and 1 could be compressed by lossless compression or with lossy compression of a certain minimum quality, such that none of the pixels changes value. Alternatively, a segmentation mask using the values 0 and 255 could be quantised and compressed by lossy compression. The lossy compression can permit the values to deviate from their initial levels, provided that the quantisation is robust to these deviations, so that there are never reconstruction errors. There are various ways to ensure this. In one example, quantisation and quality factor parameters could be chosen so that, over a large training data set of views, the likelihood of error is low or zero. Alternatively, the parameters can be optimised online by the encoder, for a given set of views being encoded. For this purpose, the encoder 100 can include a local decoder 200, which decodes the packed frame 40 and reconstructs the block segmentation masks 12 prior to transmission of the bitstream 16. The encoder 100 can check if accurate reconstruction has occurred by comparing the decoded block segmentation masks, from the local decoder, with the original block segmentation masks. The encoder 100 can iteratively quantise the block segmentation masks 12; generate, compress and encode the packed frame 40, decode the packed frame 40 and compare the reconstructed block segmentation masks with the originals, changing the quantisation and/or compression conditions each time in order to achieve accurately reconstructed block segmentation masks with the smallest amount of data. The optimal solution can then be applied to a packed frame 40 and the resulting bitstream 16 transmitted.

Figure 10:
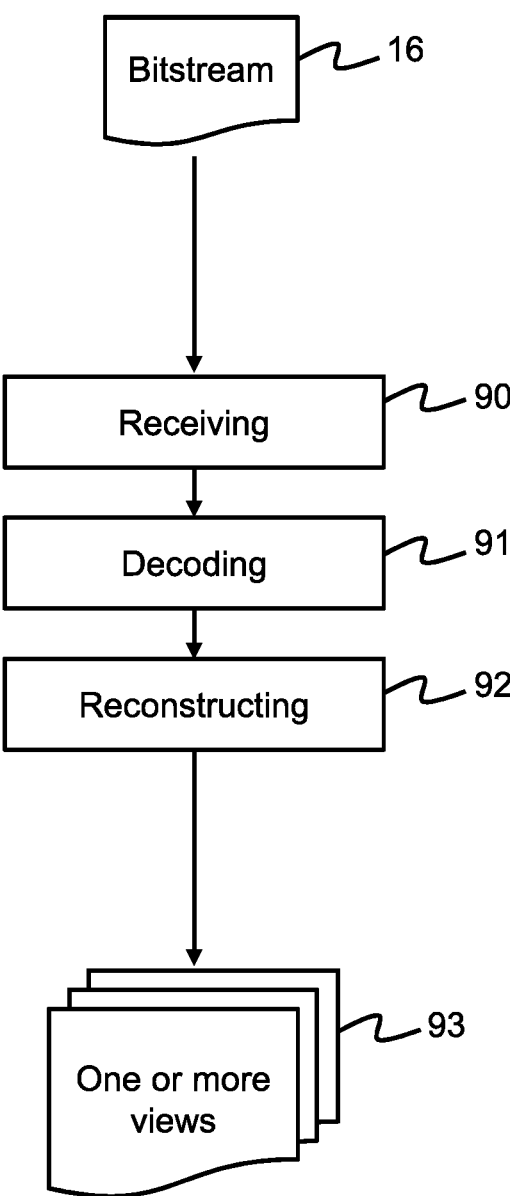
FIG. 10 illustrates a decoding method performed by the decoder of FIG. 9.

The encoding and decoding methods of FIGS. 2, 8 and 10, and the encoder 100 and decoder 200 of FIGS. 1 and 9, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs) or graphics processing units (GPUs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Various modifications to the examples described above are possible. For instance, in the examples described above, the block segmentation maps were provided to the encoder. In some embodiments, the encoder may include a segmentation unit configured to receive the views 10 and configured to use chroma keying (or another segmentation algorithm) to produce the block segmentation masks 12.

In some embodiments, the first and second pixel values used in the block segmentation masks 12 may be chrominance, depth or transparency values. Where a block segmentation mask 12 contains two areas of interest, a first and second pixel value can be used to indicate the first and second areas of interest respectively, and a third pixel value can be used to indicate the background area. For instance, the value 0 may denote background, and the values 128 and 255 may denote first and second areas of interest (for example, foreground objects). Widely spaced values like these may be suitable for lossy compression. Alternatively, the values 1 and 2 may be used for the areas of interest, while the value 0 is used for the background. Adjacent values like these may be suitable for lossless compression, where there is no risk of deviations being introduced in the values.

In some embodiments, the packing unit 120 may generate two or more packed frames. A first packed frame may comprise the two or more block segmentation masks 12. A second packed frame may comprise the block image data 13. The two or more packed frames are passed to the video encoder 130. The video encoder 130 may encode a first bitstream comprising the first packed frame and a second bitstream comprising the second packed frame. The compression of the first bitstream may be lossless, the second lossy.

It is not essential that the blocks of pixels are the same size in all views. In some embodiments, blocks of pixels of some or all of the views may be of different sizes. Compression and decompression of a packed frame can be done with any suitable algorithm known in the art, such as H.264 or a range of MPEG codecs.

In some embodiments, the block segmentation masks 12 and block image data 13 need not be packed contiguously. For example, the block segmentation mask of a first view may be followed immediately by the block image data of the first view, which may be followed by the block segmentation mask of a second view and the block image data of the second view and so on for all views.

Storage media may include volatile and non-volatile computer memory such as RAM, PROM, EPROM, and EEPROM. Various storage media may be fixed within a computing device or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A method comprising:
obtaining a block segmentation mask of block image data of a view for each of a plurality of views;
generating at least one packed frame, wherein the at least one packed frame comprises:
the plurality of block segmentation masks; and the block image data of the plurality of views; and
encoding the at least one packed frame into at least one bitstream, wherein
each view is divided into blocks of pixels,
wherein each of the block segmentation masks indicates which blocks of pixels belong to an area of interest,
wherein the area of interest comprises a portion of the view,
wherein the block image data comprises the blocks of pixels of the area of interest
wherein the at least one packed frame comprises a first contiguous part and a second contiguous part,
wherein the first contiguous part comprises the block segmentation masks of the plurality of views; and
wherein the second contiguous part comprises the block image data of the plurality of views.

2. The method of claim 1, wherein the blocks of pixels of the block image data of a view are the same size.

3. The method of claim 1,
wherein the block image data comprises different views,
wherein the block image data is packed in the at least one packed frame in a block-interleaved arrangement,
wherein a first block of pixels of a first view is followed consecutively by a second block of pixels of a second view.

4. The method of claim 1,
wherein the block image data comprises different views,
wherein the block image data is packed in the at least one packed frame in a row- interleaved arrangement,
wherein the blocks of pixels of a first row of a first view are followed consecutively by the blocks of pixels of a second row of a second view.

5. The method of claim 1, wherein encoding the at least one packed frame into the at least one bitstream comprises using a video compression algorithm.

6. The method of claim 5, further comprising choosing a quality factor of the video compression algorithm,
wherein at least one of the block segmentation masks is reconstructable from the at least one bitstream with an error rate that is dependent upon the quality factor.

7. The method of claim 5, further comprising choosing a number of quantization levels,
wherein the quantization levels are used in the video compression algorithm, wherein
the block segmentation masks are reconstructable from the at least one bitstream with an error rate that is dependent upon the quantization levels.

8. The method of claim 1, further comprising:
quantizing each of the block segmentation masks to a first number of quantization levels; and
quantizing the block image data to a second number of quantization levels, wherein the first number is different from the second number.

9. The method of claim 1,
wherein the at least one packed frame comprises a depth part, wherein the depth part comprises depth data of the plurality of views.

10. A non-transitory computer-readable medium comprising a computer program that, when executed on a processor, performs the method as claimed in claim 1.

11. The method of claim 5, further comprising choosing a number of quantization levels,
wherein the quantization levels are used in the video compression algorithm, wherein
the block segmentation masks are reconstructable from the at least one bitstream with an error rate that is dependent upon the quantization levels.

12. A method of decoding comprising:
receiving at least one bitstream,
wherein the at least one bitstream comprises at least one packed frame,
wherein the at least one packed frame comprises:
a first contiguous part comprising a block segmentation mask of each of a plurality of views; and
a second contiguous part comprising block image data of each of the plurality of views,
wherein each view is divided into blocks of pixels,
wherein the block image data comprises the blocks of pixels of an area of interest,
wherein each of the block segmentation masks indicates the locations of the blocks of pixels of an area of interest,
wherein the area of interest comprises a portion of the view; decoding
the at least one bitstream so as to obtain the at least one packed frame; and
reconstructing at least one of the plurality of views by arranging the block image data according to the locations.

13. An encoder comprising:
an input circuit,
wherein the input circuit is arranged to obtain a block segmentation mask for each of a plurality of views,
wherein the input circuit is arranged to obtain block image data for each of a plurality of views,
wherein each view is divided into blocks of pixels,
wherein each of the block segmentation masks indicates which blocks of pixels belong to an area of interest,
wherein the area of interest comprises a portion of the view,
wherein the block image data comprises the blocks of pixels of the area of interest;
a packing circuit,
wherein the packing circuit is arranged to generate at least one packed frame,
wherein the at least one packed frame comprises:
a first contiguous part comprising the plurality of block segmentation masks; and
a second contiguous part comprising the block image data of the plurality of views; and
a video encoder circuit, wherein the video encoder circuit is arranged to encode the at least one packed frame into at least one bitstream.

14. The method of claim 13, wherein the blocks of pixels of the block image data of a view are the same size.

15. A decoder comprising: an input circuit,
wherein the input circuit is arranged to receive at least one bitstream, wherein
the at least one bitstream comprises at least one packed frame comprising:
    a first contiguous part comprising a block segmentation mask of each of a plurality of views; and
    a second contiguous part comprising block image data of each of the plurality of views,
wherein each view is divided into blocks of pixels,
wherein the block image data comprises the blocks of pixels of an area of interest,
wherein each of the block segmentation masks indicates the locations of the blocks of pixels of an area of interest,
wherein the area of interest comprises a portion of the view; a video decoder circuit,
    wherein the video decoder circuit is arranged to decode the at least one bitstream so as to obtain the at least one packed frame; and
a reconstruction circuit,
    wherein the reconstruction circuit is arranged to reconstruct at least one of the plurality of views by arranging the block image data according to the locations.

16. The decoder of claim 15, wherein the blocks of pixels of the block image data of a view are the same size.

17. A method comprising:
obtaining a plurality of block segmentation masks of block image data of a view for each of a plurality of views;
generating at least one packed frame,
    wherein the at least one packed frame comprises:
        a first contiguous part comprising the plurality of block segmentation masks; and
        a second contiguous part comprising the block image data of the plurality of views; and
encoding the at least one packed frame into at least one bitstream, wherein
each view is divided into blocks of pixels,
    wherein the block image data comprises the blocks of pixels of each area of interest in each view,
    wherein each area of interest comprises a portion of the view,
wherein each block segmentation mask is a map of each view,
wherein each block of pixels in each view is represented by a single pixel in the block segmentation mask.

18. The method of claim 17,
wherein the block image data comprises different views,
wherein the block image data is packed in the at least one packed frame in at least one of: a block-interleaved arrangement and a row-interleaved arrangement,
wherein one or more first blocks of pixels of a first view is followed consecutively by one or more second blocks of pixels of a second view.

19. A non-transitory computer-readable medium comprising a computer program that, when executed on a processor, performs the method as claimed in claim 17.

20. A method of decoding comprising: receiving at least one bitstream, wherein the at least one bitstream comprises at least one packed frame, wherein the at least one packed frame comprises:
a first contiguous part comprising a block segmentation mask of each of a plurality of views; and
a second contiguous part comprising a block image data of each of the plurality of views,
wherein each view is divided into blocks of pixels,
wherein the block image data comprises the blocks of pixels of each area of interest in each view,
wherein each area of interest comprises a portion of the view,
wherein each block segmentation mask is a map of each view, wherein each block of pixels in each view is represented by a single pixel in the block segmentation mask;
decoding the at least one bitstream so as to obtain the at least one packed frame; and
reconstructing at least one of the plurality of views by arranging the block image data according to the locations.

21. The method of claim 20,
wherein the block image data comprises different views, wherein the block image data is packed in the at least one packed frame in at least one of: a block-interleaved arrangement and a row-interleaved arrangement, wherein one or more first blocks of pixels of a first view is followed consecutively by one or more second blocks of pixels of a second view.

22. A non-transitory computer-readable medium comprising a computer program that, when executed on a processor, performs the method as claimed in claim 20.

23. An encoder comprising:
an input circuit,
    wherein the input circuit is arranged to obtain a block segmentation mask for each of a plurality of views,
    wherein the input circuit is arranged to obtain block image data for each of a plurality of views,
    wherein each view is divided into blocks of pixels,
    wherein the block image data comprises the blocks of pixels of each area of interest in each view,
    wherein each area of interest comprises a portion of the view
    wherein each block segmentation mask is a map of each view,
        wherein each block of pixels in each view is represented by a single pixel in the block segmentation mask;
a packing circuit,
wherein the packing circuit is arranged to generate at least one packed frame,
wherein the at least one packed frame comprises:
    a first contiguous part comprising the plurality of block segmentation masks; and
    a second contiguous part comprising the block image data of the plurality of views; and
a video encoder circuit,
    wherein the video encoder circuit is arranged to encode the at least one packed frame into at least one bitstream.

24. The encoder of claim 23,
wherein the block image data comprises different views, wherein the block image data is packed in the at least one packed frame in at least one of: a block-interleaved arrangement and a row-interleaved arrangement, wherein one or more first blocks of pixels of a first view is followed consecutively by one or more second blocks of pixels of a second view.

25. A decoder comprising:

an input circuit, wherein the input circuit is arranged to receive at least one bitstream, wherein the at least one bitstream comprises at least one packed frame comprises:

a first contiguous part comprising a block segmentation mask of each of a plurality of views; and a second contiguous part comprising a block image data of each of the plurality of views, wherein each view is divided into blocks of pixels, wherein the block image data comprises the blocks of pixels of each area of interest in each view, wherein each area of interest comprises a portion of the view, wherein each block segmentation mask is a map of each view, wherein each block of pixels in each view is represented by a single pixel in the block segmentation mask;

a video decoder circuit, wherein the video decoder circuit is arranged to decode the at least one bitstream so as to obtain the at least one packed frame; and a reconstruction circuit, wherein the reconstruction circuit is arranged to reconstruct at least one of the plurality of views by arranging the block image data according to the locations.

26. The decoder of claim 25, wherein the block image data comprises different views, wherein the block image data is packed in the at least one packed frame in at least one of:

a block-interleaved arrangement and a row-interleaved arrangement, wherein one or more first blocks of pixels of a first view is followed consecutively by one or more second blocks of pixels of a second view.

* * * * *